United States Patent [19]
Vidmar

[11] Patent Number: 5,491,907
[45] Date of Patent: Feb. 20, 1996

[54] MULTI-FUNCTIONAL GAUGE

[75] Inventor: James F. Vidmar, Willoughby, Ohio

[73] Assignee: Hanover Catalog Holdings, Inc., Weehawken, N.J.

[21] Appl. No.: 296,519

[22] Filed: Aug. 26, 1994

[51] Int. Cl.⁶ .............................. G01B 5/02; G01B 5/18
[52] U.S. Cl. .............................. 33/832; 33/810; 33/836; 33/DIG. 1
[58] Field of Search .............................. 33/542, 712, 783, 33/810, 811, 812, 832, 833, 836, 838, DIG. 1

[56] References Cited

U.S. PATENT DOCUMENTS

| | | | |
|---|---|---|---|
| 1,248,340 | 11/1917 | Kinney | 33/836 |
| 2,650,435 | 9/1953 | Kidd | 33/836 |
| 2,910,779 | 11/1959 | Patton | 33/836 |
| 4,165,566 | 8/1979 | Lycan | 33/836 |
| 4,303,054 | 12/1981 | Lore | 33/DIG. 1 |
| 5,168,637 | 12/1992 | Gibson | 33/832 |
| 5,313,715 | 5/1994 | Wang | 33/832 |

FOREIGN PATENT DOCUMENTS 705653   6/1931   France .............................. 33/832

8031   7/1897   Sweden .............................. 33/832

*Primary Examiner*—William A. Cuchlinski, Jr.
*Assistant Examiner*—G. Bradley Bennett
*Attorney, Agent, or Firm*—Thompson, Hine and Flory

[57] ABSTRACT

A multi-functional gauge comprised of a frame, an adjustment seat, a scale and a magnet assembly. The frame includes a chamber for receiving the adjustment seat and the depth rod, and a base extending toward one side of the frame for maintaining the stability of the frame and accommodating the magnet assembly. The adjustment seat includes an indicator plate, a depth rod, a lock screw and a lock knob which are threadedly engaged with each other. The scale is longitudinally secured on the frame, and along the scale the adjustment seat can be set in position or loosened for free movement by the threading engagement of the lock screw and the lock knob. The adjustment seat is provided with at least one window which corresponds to the scale so that the scale can be read therefrom, and a tongue which extends from the wall of the window. The magnet assembly includes a magnet, iron plates and an insertion element.

18 Claims, 7 Drawing Sheets

MULTI-FUNCTIONAL GAUGE

BACKGROUND OF THE INVENTION

The invention relates to a multi-functional gauge, and in particular, to a gauge suitable for making height and depth measurements in woodworking.

U.S. Pat. No. 5,168,637 discloses a measuring device comprising a frame on which a rail-like groove is provided for guiding an adjustment seat. The adjustment seat is movably secured to the frame by a lock knob which has a screw passing through the rail-like groove and threadedly engaging a block. The adjustment seat can be held in position on the frame if the thread engagement is tight, or can be moved along the frame if the thread engagement is loosened. The adjustment seat is provided at the front portion with a platform under which an extension plate is attached. When measurements are carried out, the extension plate is aligned with the top surface of a workpiece to be measured and a scale is read at one side of the frame with zero starting from the bottom of the base of the frame; however, if the extension plate is aligned with the bottom surface of the workpiece, the other scale is read at the other side of the frame with zero starting a small distance above the bottom of the base of the frame, the distance between the bottom of the base and zero being equal to the thickness of the extension plate. The base of the frame extends towards one side a proper distance so as to maintain the stability of the frame.

Summary of the Invention

It is an object of the present invention to provide a multi-functional gauge comprising an adjustment seat having an indicator plate and a depth rod, so that measurements of heights or depths of workpieces can be carried out.

It is a further object of the present invention to provide a multi-functional gauge comprising windows on the adjustment seat, so that reading of the scale can be more convenient and clear, and both the height of a workpiece or the height of a cut in the workpiece can be read at one side of the gauge.

Still further, it is an object of the present invention to provide a multi-functional gauge comprising a magnet assembly which enables the gauge to be stably retained on a metal working surface so that measurement errors due to vibrations or machine movements can be greatly reduced; and to provide a multi-functional gauge having a tang on the back side of the frame so as to facilitate adjustment of a saw blade.

In summary, the invention is a depth-of-cut gauge for use with woodworking tools such as circular saws and table saws, and includes a frame, an adjustment seat, a scale and a magnet assembly. The frame is shaped to be placed upon a work table or saw table which supports the workpiece to be measured, and includes a chamber for receiving the adjustment seat and the depth rod and a base extending toward one side of the frame for maintaining the stability of the frame and retaining the magnet assembly. The adjustment seat includes an indicator plate, a depth rod and a lock screw and a lock knob which are threadedly engaged with each other. The scale is longitudinally secured on the frame, and along the scale the adjustment seat can be set in position, or loosened for free movement, by the threading engagement of the lock screw and the lock knob. The adjustment seat is provided with at least one window which corresponds to the scale so that the scale can be read therefrom, and a tongue which extends from the wall of the window. The magnet assembly includes a magnet, iron plates and an insertion element.

These and other objects, advantages and features of the present invention will be more fully understood and appreciated by reference to the following description, the accompanying drawings and the appended claims.

Detailed Description of the Invention

Figure 1:
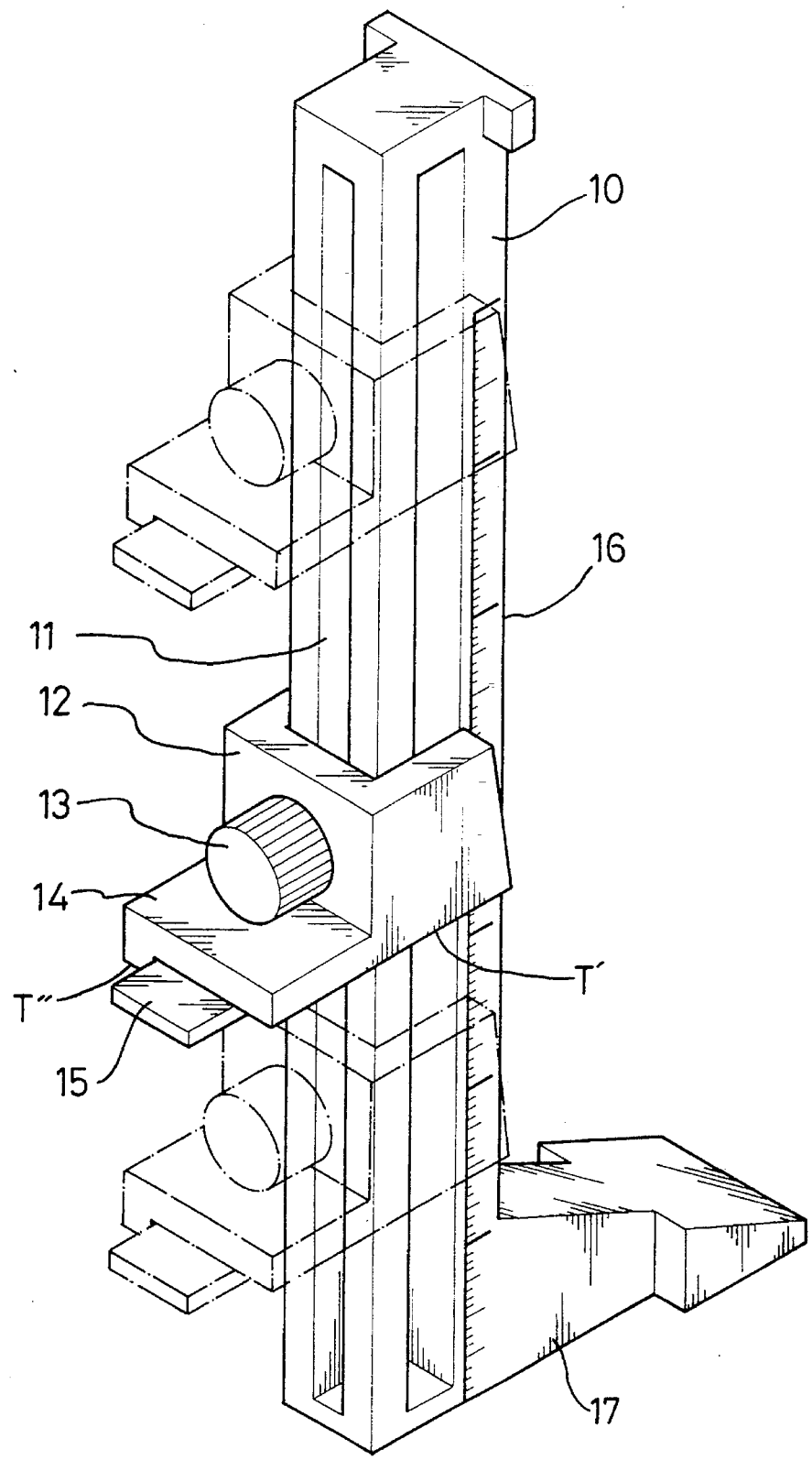
FIG. 1 is a perspective view of a prior art measuring device showing an adjustment seat in various positions.

As shown in FIG. 1, the measuring device disclosed in U.S. Pat. No. 5,168,637, the disclosure of which is incorporated by reference, comprises a frame 10 on which a rail-like groove 11 is provided for guiding an adjustment seat 12. The adjustment seat 12 is movably secured to the frame 10 by a lock knob 13 which has a screw (not shown) passing through the rail-like groove 11 and being threadedly engaged with a block (not shown). Therefore, by means of threaded engagement between the screw and the block, the adjustment seat 12 is held in position on the frame 10. The adjustment seat 12 is provided at the front with a platform 14 under which an extension plate 15 is attached.

When measurements are carried out, the extension plate 15 is aligned with the top surface of a workpiece to be measured (not shown) and a scale 16 is read at one side of the frame 10 with zero starting from the bottom of a base 17 of the frame. Alternatively, the extension plate 15 can be aligned with the bottom surface of the workpiece, in which case the other scale (not shown) is read at the other side of the frame 10 with zero starting a small distance above the bottom of the base 17 of the frame, the distance between the base and zero being equal to the thickness of the extension plate 15. A portion of the base 17 extends perpendicularly to the groove 11 a proper distance so as to maintain the stability of the frame 10.

Figure 2:
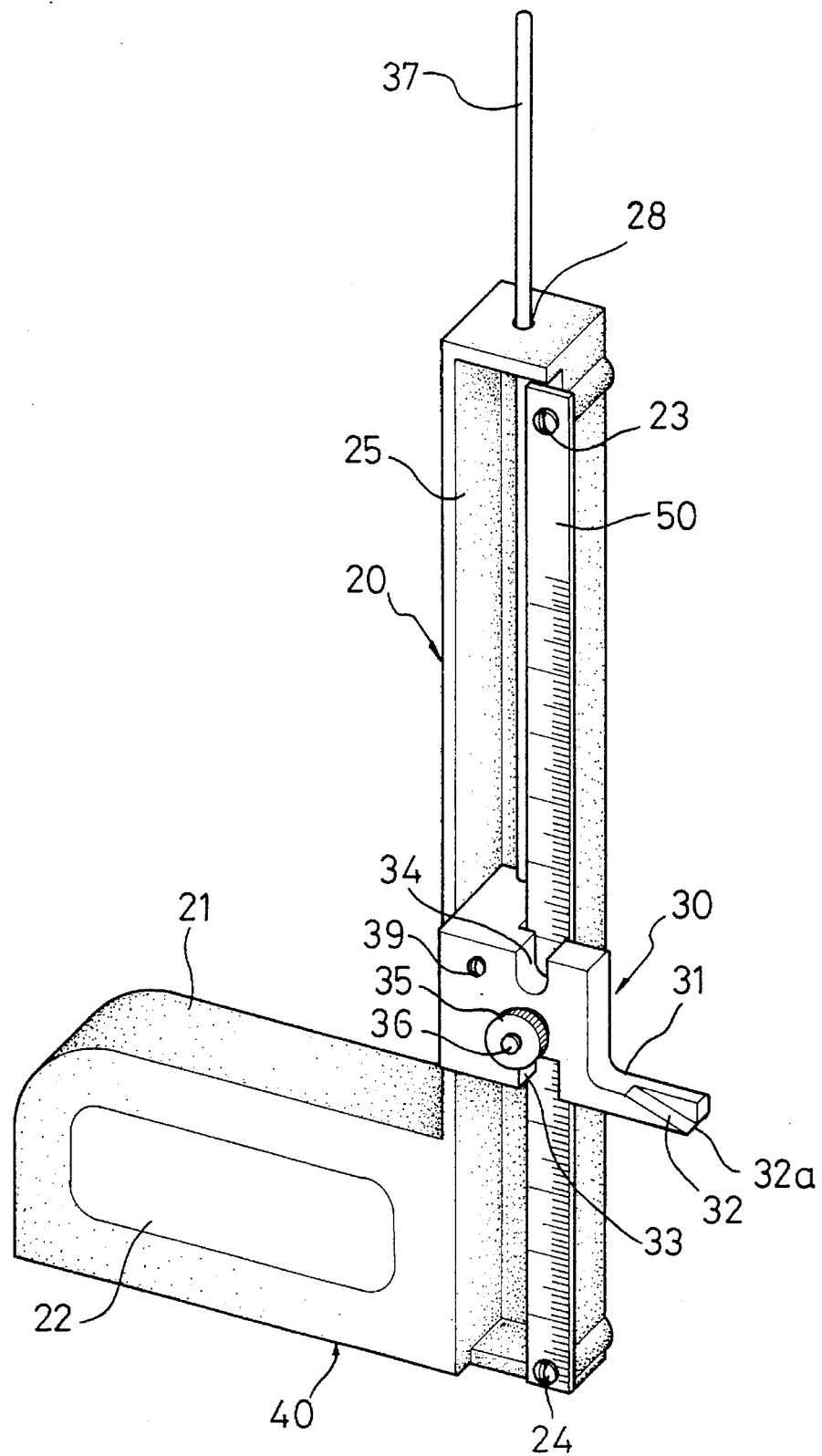
FIG. 2 is a perspective view of the multi-functional gauge of the present invention.
Figure 3:
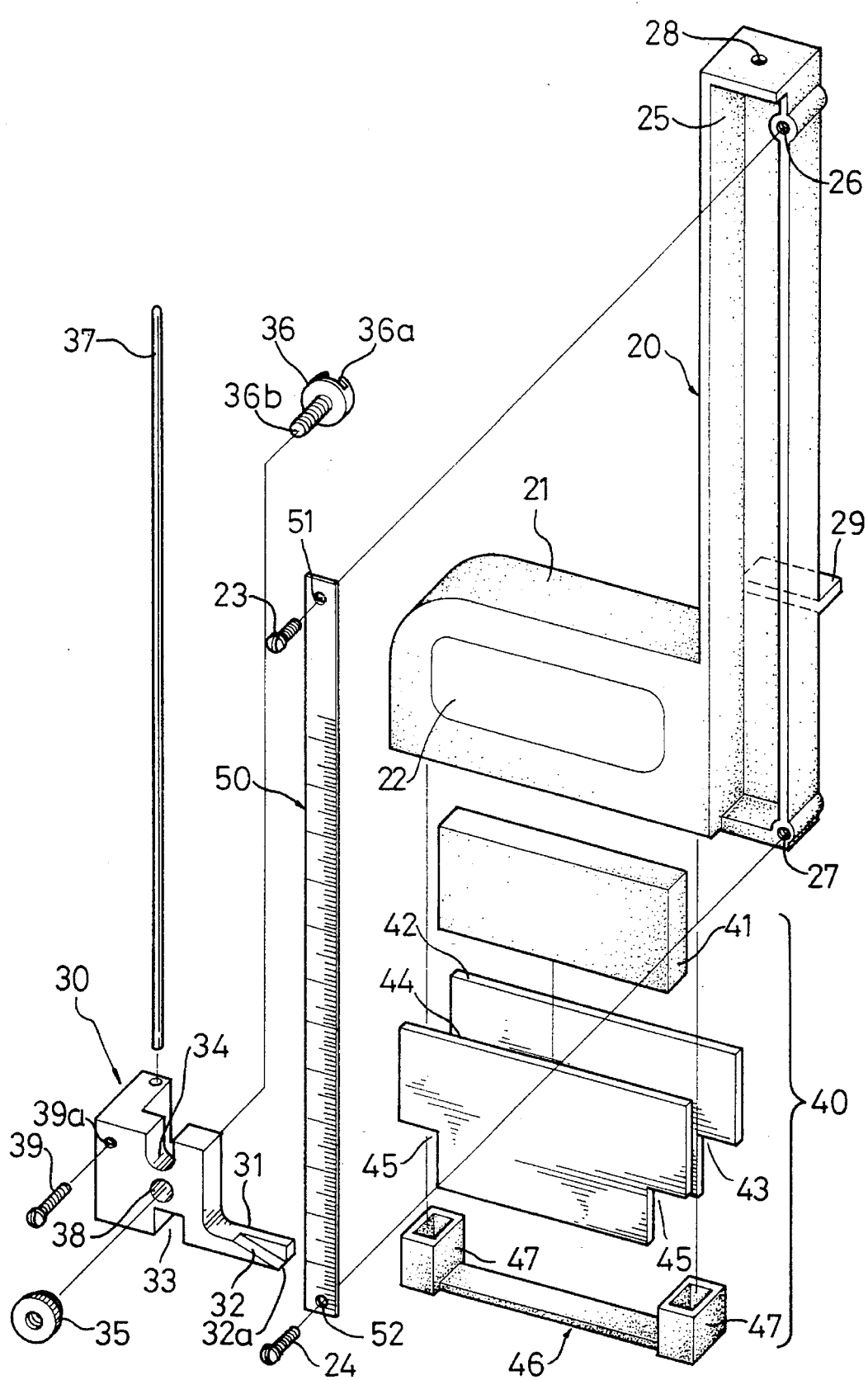
FIG. 3 is an exploded perspective view of the gauge shown in FIG. 2.

Now referring to FIGS. 2 and 3, the multi-functional gauge of the present invention is comprised of a frame 20, an adjustment seat 30 including an indicator plate 31 and a depth rod 37, a scale 50 and a magnet assembly 40. The frame 20 includes a chamber 25 defined by the longitudinal portion of the frame and having an opening toward the front of the frame. The chamber 25 encompasses a rearwardly-extended portion of the adjustment seat 30 on which the depth rod 37 is secured. At the top of the longitudinal portion of the frame 20, a hole 28 is provided for extending out the depth rod 37. The scale 50 is fastened to the frame 20 at the right side of the opening by the mounting screws 23 and 24.

A base 21 is extended horizontally and leftwardly from the longitudinal portion of the frame 20. The underside of the base 21 is open so that the magnet assembly 40 can be inserted therein. A mark recess 22 may be provided at each side of the base 21.

The adjustment seat 30 includes the rearwardly-extended portion (as aforementioned) and a rightwardly-extended portion which are perpendicular to each other, a lock knob 35, a lock screw 36, and a set screw 39. The rightwardly-extended portion is provided with a threaded hole 39a for threading therein the set screw 39, a hole 38 for passing through the stem 36b of the lock screw 36, upper and lower edges of the adjustment seat 30, and an indicator plate 31 extending for a suitable length from the lower part of the adjustment seat 30. The indicator plate 31 includes a cut 32 with a scoring tip 32a. The cut 32 is preferably of a triangular shape, however, it is possible to provide the cut in alternate shapes without departing from the scope of the invention as long as the scoring tip 32a is provided at the end of the indicator plate 31. The scoring tip 32a can be used to score lines on a workpiece.

The scale 50 is at first inserted through the groove 36a provided at the head of the lock screw 36 and then secured to the frame 20 by the mounting screws 23 and 24 (as aforementioned). The head of the lock screw 36 is submerged into a recess (not shown) located opposite to the hole 38. Therefore, after tightening the lock knob 35, the head of the lock screw 36 and the wall of the adjustment seat 30 will clamp on the scale 50 so that the adjustment seat 30 is maintained in position and the scale 50 can be read by viewing through the windows 33 and 34. The depth rod 37 is secured to the adjustment seat 30 by the set screw 39, and is set to zero by aligning the top surface of the depth rod with the top surface of the frame 10 when the bottom surface of the adjustment seat is aligned with the bottom surface of the frame.

The magnet assembly 40, shown in FIG. 3, is retained within a recess (not shown) of the base 21, as mentioned above. The magnet assembly 40 includes a magnet 41 set in the middle and a pair of iron plates 42 and 44 positioned at the sides of the magnet. An insertion element 46 is inserted into the recess so that retaining blocks 47 depress on the cuts 43 and 45 of the iron plates 42 and 44 so that the whole magnet assembly 40 can be maintained in position. The insertion element 46 may be applied with glue to make sure that the magnet assembly 40 is permanently secured in the base 21. The bottom ends of the iron plates 42 and 44 are maintained a small distance away from the bottom plane of the base 21, so that the iron plates 42 and 44 will not protrude from the base and affect a precision measurement. Therefore, through transmission of magnetic force from the magnet 41 to the iron plates 42 and 44, the multi-function gauge can be temporarily attached to the metal part of a machine to stabilize the gauge during a measurement.

Figure 4:
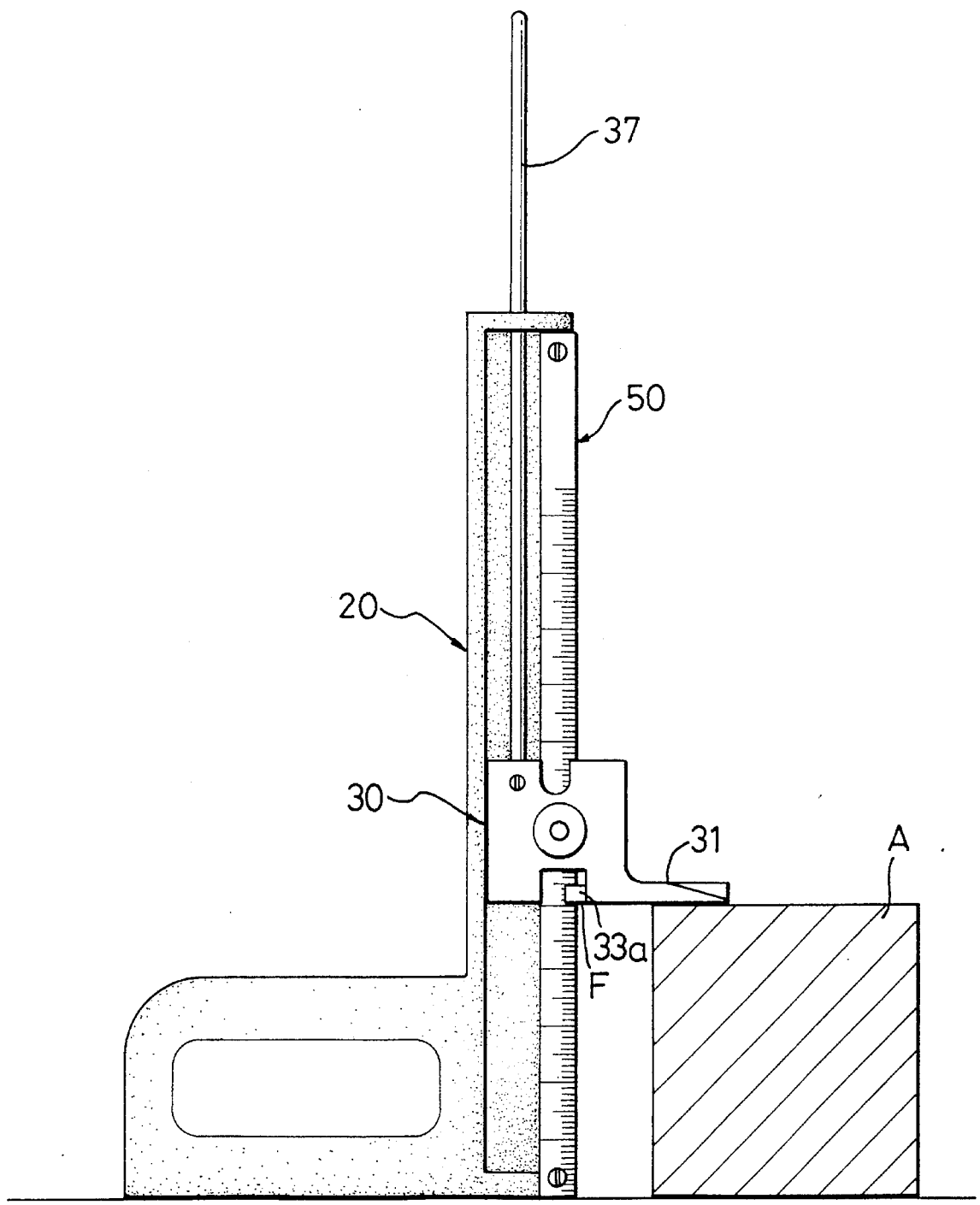
FIG. 4 is a side elevational view of the gauge of FIG. 2 showing measurement of the height of a workpiece.

FIG. 4 shows the height of a workpiece A being measured. To facilitate reading of the scale 50, a tongue 33a extends from the bottom plan of the adjustment seat 30. The tongue 33a has a height "T" which is the same as the height "t" of the indicator plate 31. In the measurement of the height of the workpiece A, the bottom surface of the indicator plate 31 abuts on the top surface of the workpiece A, and the scale 50 is read viewing the bottom surface of the tongue 33a.

Figure 5:
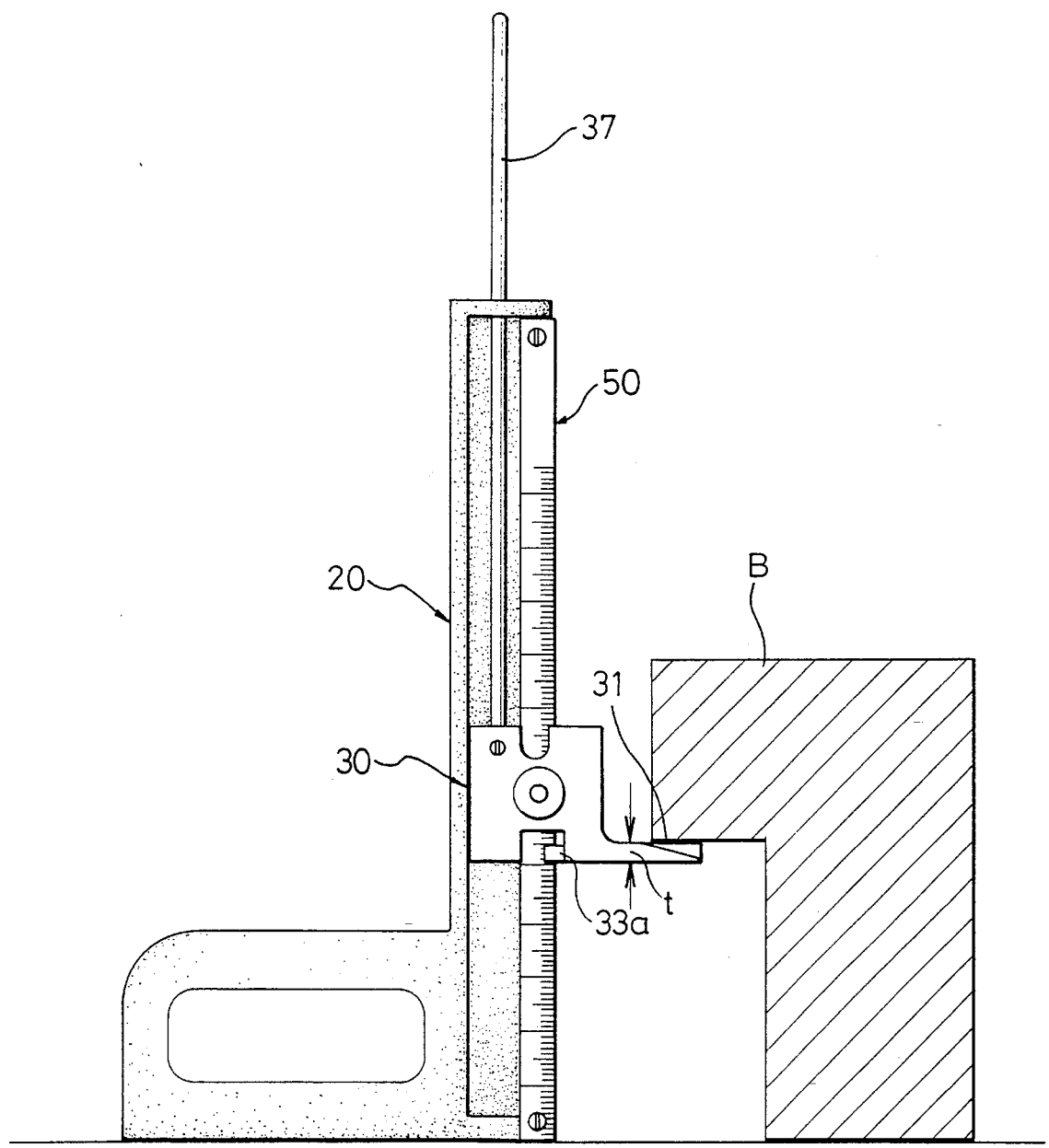
FIG. 5 is a side elevational view of the gauge of FIG. 2 showing measurement of the height of a cut in a workpiece.

As shown in FIG. 5, the height of a cut of a workpiece B is measured. In the measurement, the top surface of the indicator plate 31 abuts on the top wall of the cut, and the scale 50 is read by viewing the top surface of the tongue 33a.

Figure 6:
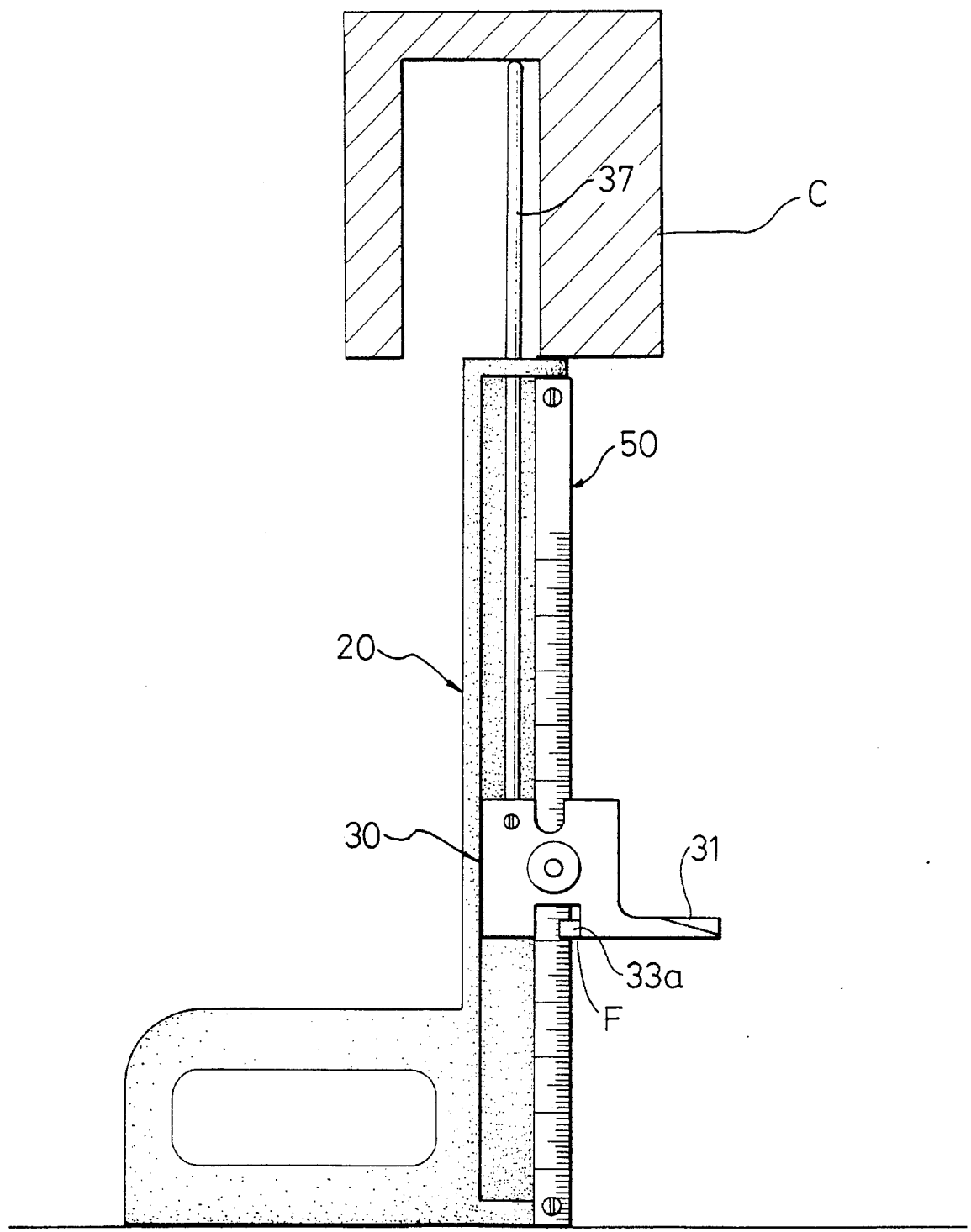
FIG. 6 is a side elevational view of the gauge of FIG. 2 showing measurement of the depth of a cut in a workpiece.

As to the measurement of the depth of a workpiece, reference may be made to FIG. 6. A workpiece C has a recess to be measured. In the measurement, the top surface of the frame 20 abuts on the outer surface of the workpiece C, while the depth rod 37 goes into the recess and abuts on the bottom of the recess. The scale 50 can then be read from the bottom surface of the tongue 33a.

As shown in FIG. 3, a tang 29 is provided at the backside of the frame 20. The length of the tang 29 is parallel to the bottom surface of the base 21. The tang 29 can be put into a miter slot (not shown) in a working table (not shown) for adjustment of a saw blade (not shown).

Figure 7:
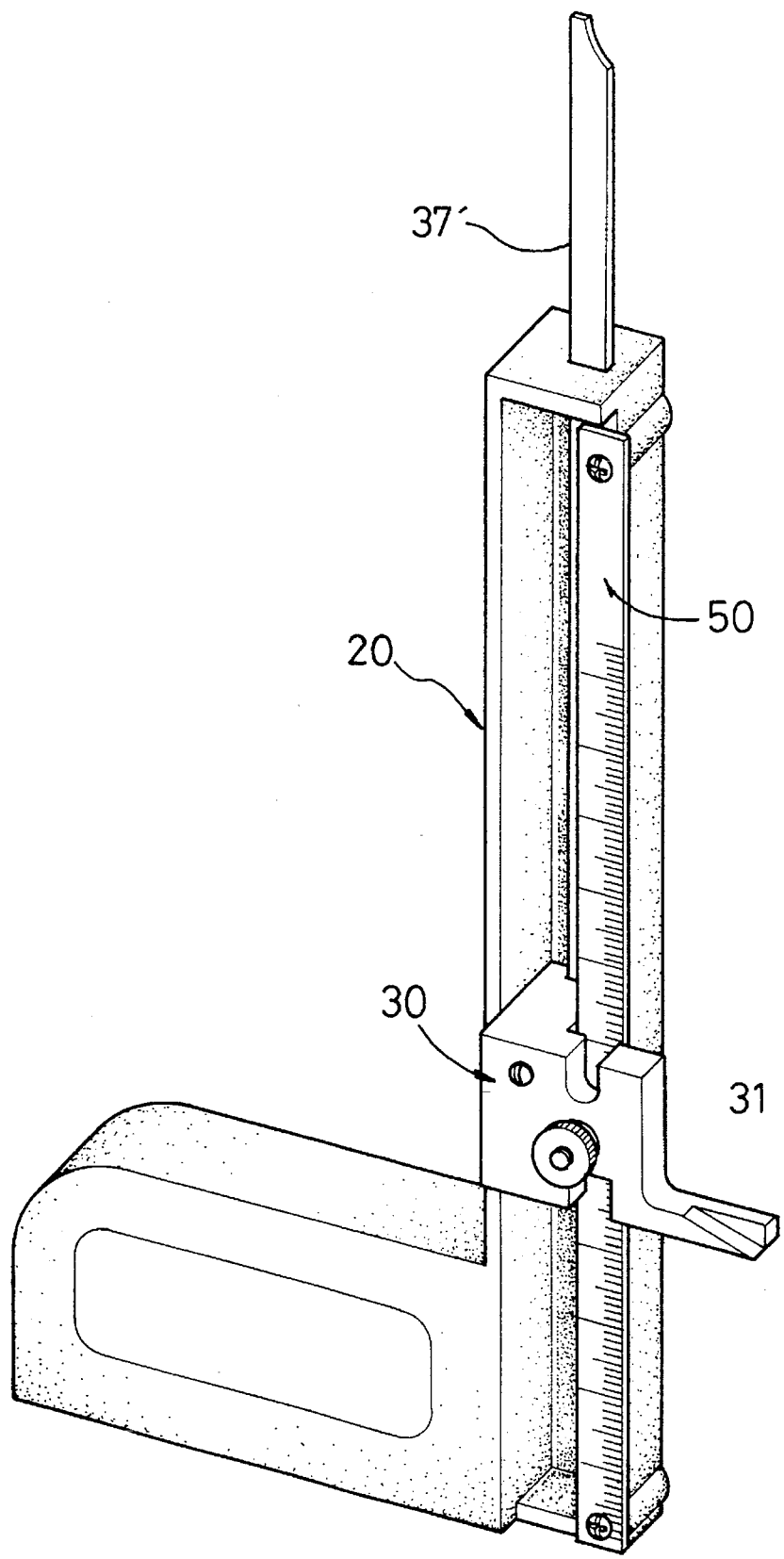
FIG. 7 is a perspective view of an alternate embodiment of the gauge of the present invention.

In FIG. 7, an alternate embodiment of the present invention is shown. This embodiment employs a flat rod 37' to take the place of the depth rod 37 (FIG. 6), meaning that no matter what the shape of the depth rod 37' is, or at which spot the depth rod 37' is secured on the adjustment seat 30, the present invention can be utilized, so long as the depth rod 37' can be secured on the adjustment seat 30 and can be properly guided by the top of the frame 20.

While the forms of apparatus herein described constitute the preferred embodiments of the invention, it is to be understood that the invention is not limited to these precise forms and that changes may be made therein without departing from the scope of the invention.

What is claimed is:

1. A multi-functional gauge comprising:

a frame including a base;

an adjustment seat mounted on said frame and movable in a vertical direction relative thereto said adjustment seat including an indicator plate and a lock screw for clamping said adjustment seat in position against said frame, said indicator plate having first second indicator surfaces;

a scale longitudinally secured on said frame, said adjustment seat being slidingly positionable along said scale; and a tongue extending from said adjustment seat adjacent to said scale having a first scale index surface corresponding to said first indicator surface and a second scale index surface corresponding to said second indicator surface.

2. The multi-functional gauge according to claim 1 wherein said adjustment seat includes a rearwardly-extended portion, a rightwardly-extended portion, and a depth rod having one end secured on said rearwardly-extending portion and the opposing end guided by said frame, and said indicator plate being an extension of said rightwardly-extended portion.

3. The multi-functional gauge according to claim 2 wherein said adjustment seat is provided with at least one window which corresponds to said scale so that said scale can be read therefrom and said tongue extends from said adjustment seat into said window.

4. The multi-functional gauge according to claim 1 wherein the indicator plate is provided at its end with a cut, the cut forming a scoring tip.

5. The multi-functional gauge according to claim 1 wherein the base extends toward one side of the frame.

6. The multi-functional gauge according to claim 1, wherein said frame includes a chamber which opens to a front face of said frame, and said scale is secured on a portion of said frame to the right of said chamber, and said lock screw includes a head having a groove through which said scale passes.

7. The multi-functional gauge according to claim 1 wherein said scale is adjustably mounted on said frame, such that said gauge can be calibrated by positioning said scale relative to said frame so that said scale is flush with the bottom of the frame.

8. A multi-functional gauge comprising:

a frame, including a base shaped to be positionable on a work surface;

a scale longitudinally secured on said frame; and an adjustment seat, slidably attached to said frame and longitudinally movable with respect to said scale, said adjustment seat including an indicator plate having upper and lower indicator surfaces;

a first scale index adjacent to said scale, corresponding to said upper indicator surface; and a second scale index adjacent to said scale, corresponding to said lower indicator surface;

whereby said adjustment seat is positionable along said frame to take height measurements from a top surface of a workpiece with said lower indicating surface, and from an elevated bottom surface of a workpiece with said upper indicating surface.

9. The gauge of claim 8 wherein said adjustment seat includes a tongue, positioned adjacent to said scale, having a top index surface and a bottom index surface; said top index surface including said first scale index, and said bottom index surface including said second scale index.

10. The gauge of claim 9 wherein said adjustment seat includes means for releasably locking said adjustment seat with respect to said scale.

11. The gauge of claim 10 wherein said indicator plate includes a tapered surface at an end thereof, forming a scoring tip.

12. The gauge of claim 11 wherein said adjustment seat includes a depth rod having one end attached to said adjustment seat and an opposite end extending through and protruding upwardly from said frame, whereby said rod and said adjustment seat are positionable along said frame to take depth measurements of a recess in a workpiece adjacent to an upper end of said frame.

13. The gauge of claim 12 wherein said releasable locking means includes a lock screw, having a head with a slot shaped to slidably receive said scale and a shaft extending through and protruding from said adjustment seat; and a lock knob attached to said shaft.

14. The gauge of claim 13 wherein said scale is adjustably mounted on said frame such that the gauge can be calibrated by positioning said scale relative to said frame so that said scale is flush with a bottom surface of said base.

15. The gauge of claim 8 wherein said adjustment seat includes a window superposed to said scale so that said scale can be read therethrough, and said first and second scale indexes extend from said adjustment seat into said window.

16. The gauge of claim 8 wherein a distance between said top indicator surface and said bottom indicator surface is equal to a distance between said first scale index and said second scale index.

17. The gauge of claim 8 further comprising a magnet assembly mounted in said base for holding said gauge against a metal part during use of said gauge.

18. A multi-functional gauge comprising:

a frame, including a base shaped to be positionable on a work surface;

a scale longitudinally secured on said frame;

an adjustment seat, slidably attached to said frame and longitudinally movable with respect to said scale, said adjustment seat including a workpiece indicator and at least one scale index adjacent to said scale and corresponding to said indicator;

a lock screw, having a head with a slot shaped to slidably receive said scale and a shaft extending through and protruding from a first face of said adjustment seat, said head partially residing in a recess in an opposing second face of said adjustment seat; and a lock knob threadedly engaged to said shaft, adjacent to said first face of said adjustment seat;

whereby tightening said lock knob to said lock screw causes said scale to be clamped between said second face of said adjustment seat and said slot of said lock screw head, thus maintaining said adjustment seat in position with respect to said scale.

* * * * *